(12) United States Patent
Kishimoto et al.

(10) Patent No.: US 12,181,921 B2
(45) Date of Patent: Dec. 31, 2024

(54) DISPLAY DEVICE AND METHOD OF MANUFACTURING THE SAME

(71) Applicant: Samsung Display Co., Ltd., Yongin-si (KR)

(72) Inventors: Hirotsugu Kishimoto, Hwaseong-si (KR); Dasom Gu, Asan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 154 days.

(21) Appl. No.: 17/949,227

(22) Filed: Sep. 21, 2022

(65) Prior Publication Data

US 2023/0132000 A1    Apr. 27, 2023

(30) Foreign Application Priority Data

Oct. 26, 2021    (KR) ........................ 10-2021-0143399

(51) Int. Cl.
     *G06F 1/16*      (2006.01)

(52) U.S. Cl.
     CPC .......... *G06F 1/1643* (2013.01); *G06F 1/1616* (2013.01); *G06F 1/1652* (2013.01)

(58) Field of Classification Search
     CPC ..... G06F 1/1643; G06F 1/1616; G06F 1/1652
     See application file for complete search history.

(56) References Cited

U.S. PATENT DOCUMENTS

| | | | |
|---|---|---|---|
| 10,512,160 B2 | 12/2019 | Lee et al. | |
| 2004/0189587 A1* | 9/2004 | Jung | ................... G02F 1/13338 345/102 |
| 2010/0171891 A1* | 7/2010 | Kaji | ........................ G06F 3/046 349/12 |
| 2013/0021762 A1* | 1/2013 | van Dijk | ................ G06F 1/1681 361/749 |
| 2014/0111954 A1* | 4/2014 | Lee | ...................... H04M 1/0268 361/749 |
| 2014/0139447 A1* | 5/2014 | Kang | .................... G06F 3/0443 345/173 |
| 2016/0007441 A1* | 1/2016 | Matsueda | ................ G09F 9/301 361/749 |

(Continued)

FOREIGN PATENT DOCUMENTS

| | | |
|---|---|---|
| KR | 10-1977852 | 5/2019 |
| KR | 10-2021-0000359 | 1/2021 |

*Primary Examiner* — Michael P McFadden

(74) *Attorney, Agent, or Firm* — CANTOR COLBURN LLP

(57) ABSTRACT

A display device includes a display panel including a first non-foldable area, a foldable area, and a second non-foldable area defined therein, a sensor including a plurality of loop portions and a plurality of line portions, and at least one transverse line comprising at least one of the loop portions and the line portions that overlaps substantially all of the first non-foldable area, the foldable area, and the second non-foldable area. The at least one transverse line includes a first rigid portion overlapping the first non-foldable area, a flexible portion overlapping the foldable area, and a second rigid portion overlapping the second non-foldable area. The flexible portion has a first width, the first rigid portion has a second width, the second rigid portion has a third width, with the first width being greater than the second width and the third width.

12 Claims, 17 Drawing Sheets

(56) References Cited

U.S. PATENT DOCUMENTS

2017/0147115 A1\* 5/2017 Ide .................... G06F 3/0445
2020/0401275 A1 12/2020 Shin et al.
2021/0407344 A1\* 12/2021 Lee .................... H10K 59/131
2022/0129094 A1\* 4/2022 Tatsuno ............. G06F 3/04162

\* cited by examiner

DISPLAY DEVICE AND METHOD OF MANUFACTURING THE SAME

CROSS REFERENCE TO RELATED APPLICATION

This application claims priority from and the benefit of Korean Patent Application No. 10-2021-0143399, filed on Oct. 26, 2021, which is hereby incorporated by reference for all purposes as if fully set forth herein.

BACKGROUND

Field

Embodiments of the invention relate generally to display devices and more specifically, to a display device including a digitizer and a method of manufacturing the display device.

Discussion of the Background

A display device displays a variety of images through a display screen to provide a user with information. In general, the display device displays the information in a display screen associated therewith. In recent years, flexible display devices including a flexible display panel that is foldable have been developed. Different from a rigid display device, the flexible display device can be folded, rolled, or bent. Since the shape of the flexible display device may be changed in various ways, it is easy to carry the flexible display device regardless of its original screen size, and thus, a user convenience is improved.

Many display devices work with a stylus or other type of input device that enables the user to interact with the information displayed on the screen to enter inputs, select items or the like. A digitizer is incorporated into the display panel to sense the location of the input device, The above information disclosed in this Background section is only for understanding of the background of the inventive concepts, and, therefore, it may contain information that does not constitute prior art.

SUMMARY

Applicant discovered that repeated folding or rolling of flexible display devices can adversely affect the foldability of the display device and/or the reliability of the digitizer incorporated in the display.

Flexible devices constructed according to the principles and illustrative embodiments of the invention and methods of manufacturing the same are capable of improving foldability and/or reliability of a flexible display device having a digitizer.

For example, the portions of the conductive lines disposed in the foldable area of the digitizer are flexible, and thus, the folding reliability of the digitizer is improved. In addition, the flexible lines may be formed by patterning the flexible pattern (paste) using a laser beam, thereby the printing tolerance can be compensated for even if a position error occurs when printing the flexible pattern. Accordingly, the manufacturing process of the digitizer becomes easier and more reliable. Further, since the flexible lines are formed by patterning the flexible pattern using the laser beam, the distance between the flexible lines is precisely controlled. Therefore, the flexible lines spaced apart from each other at a fine distance are formed in an area where the lines are densely arranged.

Additional features of the inventive concepts will be set forth in the description which follows, and in part will be apparent from the description, or may be learned by practice of the inventive concepts.

According to one aspect of the invention, a display device includes: a display panel including a first non-foldable area, a foldable area adjacent to the first non-foldable area and foldable about to a folding axis, and a second non-foldable area adjacent to the foldable area, the first non-foldable area, the foldable area, and the second non-foldable area being sequentially arranged along a first direction, a sensor disposed under the display panel and including a plurality of loop portions and a plurality of routing line portions connected to the loop portions, and at least one transverse line comprising at least one of the loop portions and the line portions that overlaps substantially all of the first non-foldable area, the foldable area, and the second non-foldable area. The at least one transverse line includes a first rigid portion overlapping the first non-foldable area, a flexible portion overlapping the foldable area, and a second rigid portion overlapping the second non-foldable area. The flexible portion has a first width, the first rigid portion has a second width, the second rigid portion has a third width, with the first width being greater than the second width and the third width.

The difference between the first width and the second width is between about 50 micrometers and about 200 micrometers.

The flexible portion may include a material different from a material of the first and second rigid portions.

The foldable area may have a width between about 5 mm and about 40 mm.

The first rigid portion and the second rigid portion may include copper.

The flexible portion may include a conductive material.

The flexible portion may include a conductive filler including copper, silver, or carbon.

The flexible portion may include a styrene-butadiene rubber, a butadiene rubber, a butyl rubber, a silicone rubber, or a urethane rubber.

The flexible portion may have flexibility between about 2% and about 50%.

The flexible portion may have a volume resistance between about $1\times10^{-7}$ Ωcm and about $1\times10^{-4}$ Ωcm.

Each of the first rigid portion and the second rigid portion may be provided in plural, and a distance between the first rigid portions and a distance between the second rigid portions may be equal to or less than about 200 micrometers.

The sensor may includes a digitizer, the loop portions may include coil portions, the line portions may include routing line portions, and a portion of the digitizer tht overlaps the foldable area, may have a thickness smaller than a thickness of portions of the digitizer overlapping the first and second non-foldable areas.

According to another aspect of the invention, a method of manufacturing a display device includes the steps of: forming a display panel, forming a sensor, and coupling the sensor to the display panel. The step of forming of the sensor includes preparing a substrate including a first substrate area, a second substrate area, and a third substrate area, the first, second and third areas being arranged sequentially along a first direction, forming a plurality of first rigid lines in the first substrate area, forming a plurality of second rigid lines in the third substrate area, forming a flexible pattern connected to the first rigid lines and the second rigid lines in the second substrate area, and irradiating a laser beam to the flexible pattern to form a plurality of flexible lines. At least some of the flexible lines are connected to a corresponding one of the first rigid lines and a corresponding one of the second rigid lines.

The sensor may include a digitizer and the display panel may include a first non-foldable area, a foldable area adjacent to the first non-foldable area and foldable about to a folding axis, and a second non-foldable area adjacent to the foldable area, the first non-foldable area, the foldable area, and the second non-foldable area being sequentially arranged along the first direction, the first non-foldable area, the foldable area, and the second non-foldable area respectively overlap the first, second, and third substrate areas, and the flexible lines overlap the foldable area.

The distance between the first rigid lines and a distance between the second rigid lines may be equal to or less than substantially 200 micrometers.

The step of irradiating a laser beam to the flexible pattern forms a difference between a width of each of the flexible lines and a width of each of the first rigid lines to be between about 50 micrometers and about 200 micrometers.

The flexible lines may have flexibility between about 2% and about 50%.

The flexible lines may have a volume resistance between about $1 \times 10^{-7}$ Ωcm and about $1 \times 10^{-4}$ Ωcm.

The flexible lines may include a conductive filler including copper, silver, or carbon.

The flexible lines may include a styrene-butadiene rubber, a butadiene rubber, a butyl rubber, a silicone rubber, or a urethane rubber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1A:
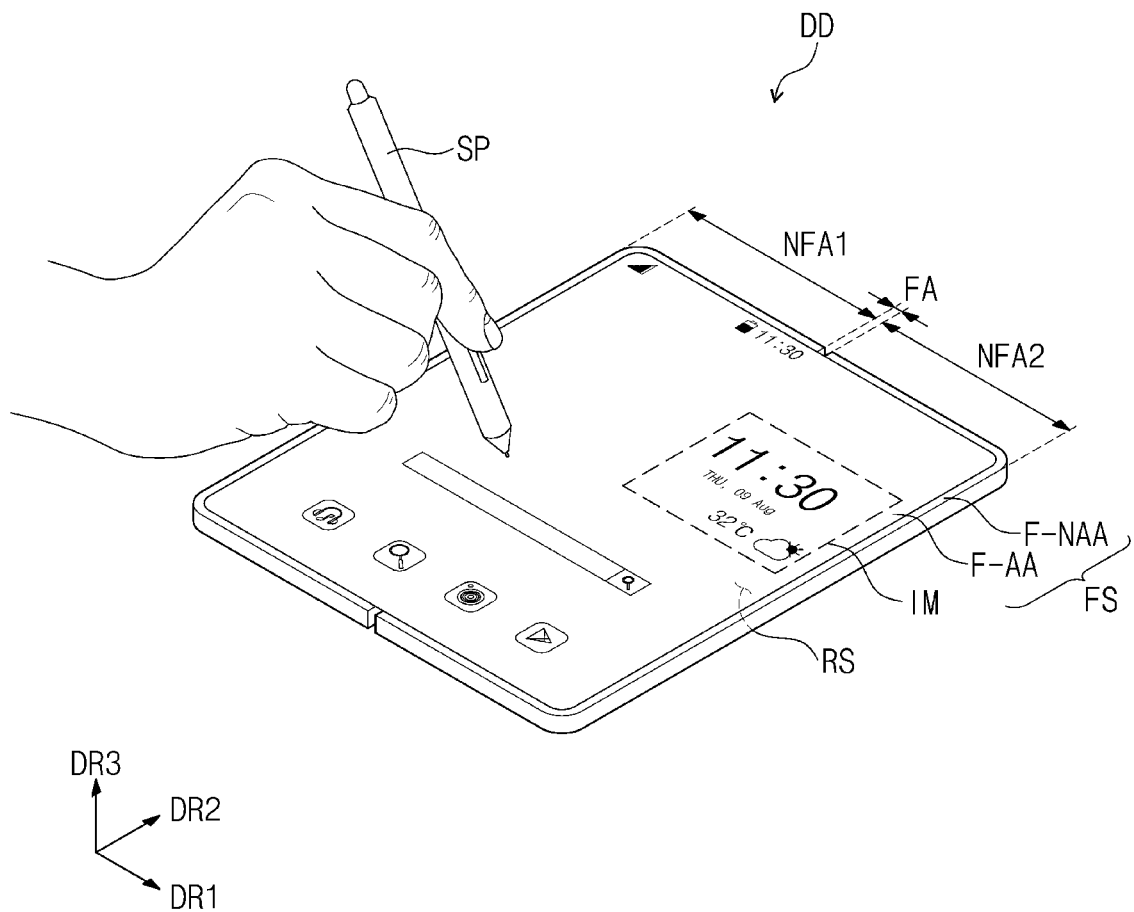
FIG. 1A is a perspective view of an embodiment of a display device constructed according to the principles of the invention in an unfolded position.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a perspective view of an embodiment of a display device DD constructed according to the principles of the invention in an unfolded position.

Referring to FIG. 1A, the display device DD may be a device activated in response to electrical signals. In the illustrated embodiment, a smartphone will be described as the display device DD. However, the display device DD may take the form of various other embodiments. For example, the display device DD may be or include a tablet computer, a notebook computer, a computer, or a smart television.

The display device DD may display an image IM through a first display surface FS that is substantially parallel to each of a first direction DR1 and a second direction DR2 toward a third direction DR3. The first display surface FS through which the image IM is displayed may correspond to a front surface of the display device DD. The image IM may include a video and a still image. FIG. 1A shows an internet search box and a clock widget as an example of the image IM.

In the illustrated embodiment, front (or upper) and rear (or lower) surfaces of each member of the display device DD may be defined with respect to a direction in which the image IM is displayed. The front and rear surfaces may be opposite to each other in the third direction DR3, and a normal line direction of each of the front and rear surfaces may be substantially parallel to the third direction DR3.

The shortest distance between the front surface and the rear surface in the third direction DR3 may correspond to the thickness or the height of the display device DD in the third direction DR3. The directions indicated by the first, second, and third directions DR1, DR2, and DR3 may be relative to each other and may be changed to other directions.

The display device DD may sense an external input applied thereto from an outside. The external input may include various forms of inputs provided from the outside of the display device DD. For example, the external inputs may include a proximity input (e.g., a hovering input) applied when approaching close to or adjacent to the display device DD at a predetermined distance as well as a touch input by a user's body part (e.g., a user's hand) or a pen, stylus or other device. In addition, the external inputs may be provided in the form of force, pressure, temperature, light, etc.

FIG. 1A shows an example of the external inputs applied using a pen SP by a user. The display device DD may sense the external inputs by an electromagnetic resonance (EMR) produced between a magnetic field generated in the display device DD and the pen SP. The pen SP may be attached to or detached from an inner or outer portion of the display device DD, and the display device DD may provide and receive signals corresponding to the attachment and detachment of the pen SP.

According to an embodiment, the display device DD may include the first display surface FS. The first display surface FS may include a first active area F-AA and a first peripheral area F-NAA. The first active area F-AA may be activated in response to the electrical signals. The image IM may be displayed through the first active area F-AA, and various external inputs may be sensed through the first active area F-AA. The first peripheral area F-NAA may be defined adjacent to the first active area F-AA. The first peripheral area F-NAA may have a predetermined color. The first peripheral area F-NAA may surround the first active area F-AA. Accordingly, the first active area F-AA may have a shape substantially defined by the first peripheral area F-NAA, however, this is merely an example. The first peripheral area F-NAA may be defined adjacent to only one side of the first active area F-AA or may be omitted.

According to an embodiment, the display device DD may include a first non-foldable area NFA1, a foldable area FA, and a second non-foldable area NFA2. The first non-foldable area NFA1, the foldable area FA, and the second non-foldable area NFA2 may be sequentially arranged in the first direction DR1. The foldable area FA may be referred to as a foldable area, and the first and second non-foldable areas NFA1 and NFA2 may be referred to as non-foldable areas. According to an embodiment, the foldable area FA may have a width equal to or greater than about 5 mm and equal to or smaller than about 40 mm.

Figure 1B:
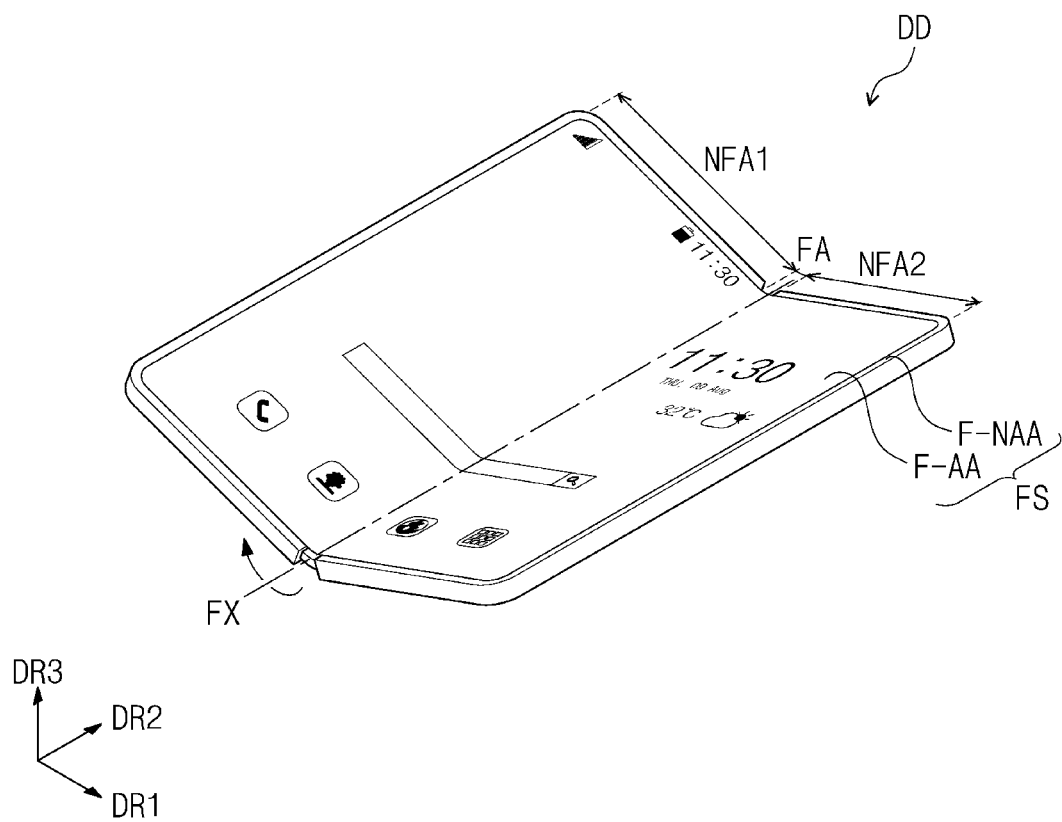
FIG. 1B is a perspective view of an embodiment of the display device of FIG. 1A illustrating an in-folding operation.

FIG. 1B is a perspective view of an embodiment of the display device DD of FIG. 1A illustrating a folding operation.

Referring to FIG. 1B, the foldable area FA may be folded with respect to a folding axis FX that is substantially parallel to the second direction DR2. The foldable area FA of the display device DD may have a predetermined curvature or radius of curvature when the display device DD is folded. The display device DD may be folded inwardly with respect to the folding axis FX to be in an in-folding position where the first non-foldable area NFA1 faces the second non-foldable area NFA2 and the first display surface FS is not exposed.

Figure 1C:
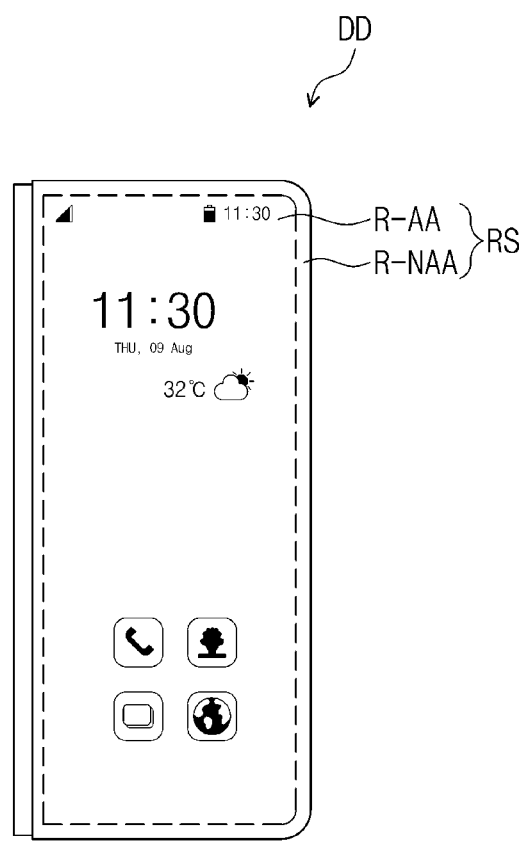
FIG. 1C is a plan view of the display device of FIG. 1A in a folded position.

FIG. 1C is a plan view of the display device DD of FIG. 1A in a folded position.

Referring to FIG. 1C, a second display surface RS of the display device DD may be viewed by a user during the in-folding position of the display device DD. In this case, the second display surface RS may include a second active area R-AA through which the image is displayed. The second active area R-AA may be activated in response to the electrical signals. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may surround the second active area R-AA. In addition, the second display surface RS may further include an electronic module area in which an electronic module including various components is disposed, and the design of the second display surface RS should not be particularly limited.

Figure 1D:
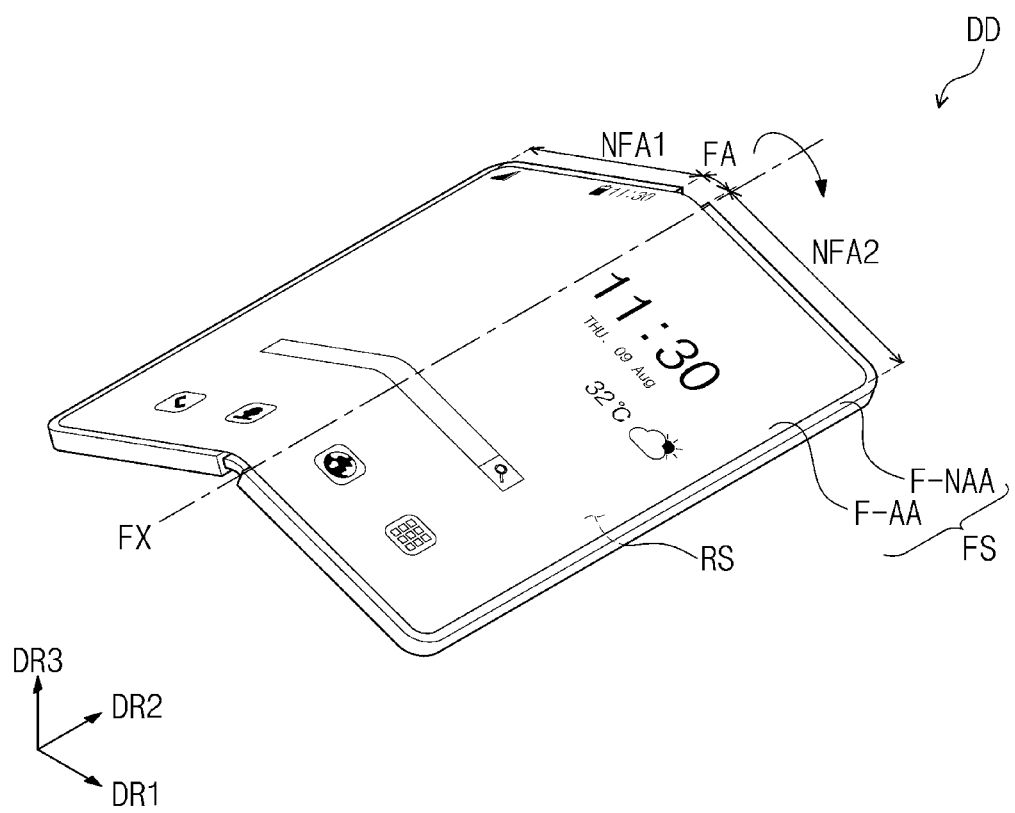
FIG. 1D is a perspective view of another embodiment of the display device of FIG. 1A illustrating an out-folding operation.

FIG. 1D is a perspective view of another embodiment of the display device DD of FIG. 1A illustrating a folding operation.

Referring to FIG. 1D, the display device DD may be folded outwardly with respect to the folding axis FX to be in an out-folding position where the first display surface FS is exposed. According to an embodiment, the display device DD may be configured to repeatedly perform an in-folding operation or an out-folding operation, however, the specific folding direction should not be particularly limited.

In FIGS. 1A to 1D, the display device DD is folded with respect to one folding axis FX, however, the number of the folding axes and the number of non-foldable areas should not be particularly limited. As an example, the display device DD may be folded with respect to a plurality of folding axes such that a portion of the first display surface FS may face a portion of the second display surface RS.

Figure 2A:
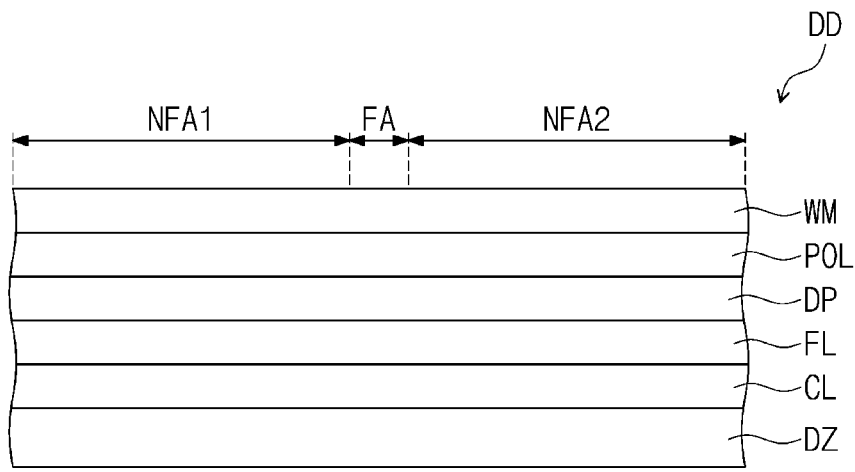
FIGS. 2A and 2B are cross-sectional views of embodiments of the display device of FIG. 1A.
Figure 2A:
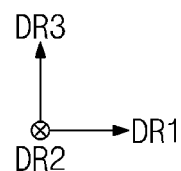

FIG. 2A is a cross-sectional view of an embodiment of the display device DD of FIG. 1A.

Referring to FIG. 2A, the display device DD may include a window WM, an optical member POL, a display panel DP, a lower film FL, a protective layer CL, and a digitizer DZ.

The window WM may be disposed on the display panel DP. The window WM may be coupled to a housing to define an exterior of the display device DD and may protect the display panel DP.

The window WM may include a material having a high light transmittance. For example, the window WM may include a glass substrate, a sapphire substrate, or a plastic film. The window WM may have a single-layer or multi-layer structure. For example, the window WM may have a stack structure of a plurality of plastic films attached to each other by an adhesive or a stack structure of the glass substrate and the plastic film attached to the glass substrate by an adhesive. Functional layers may be further disposed on the window WM to protect the window WM. For example, the functional layers may include at least one of an anti-fingerprint layer and an impact absorbing layer.

The optical member POL may be disposed under the window WM. The optical member POL may reduce the reflectance of the display panel DP with respect to the light incident to the display panel DP. The optical member POL may include at least one of an anti-reflective film, a polarizing film, a color filter, and a gray filter.

The display panel DP may be disposed under the optical member POL. The display panel DP may serve as an output device. For example, the display panel DP may display the image through the active areas F-AA and R-AA (refer to FIGS. 1A and 1C), and the user may acquire information through the image. In addition, the display panel DP may serve as an input device to sense the external input applied to the active areas F-AA and R-AA (refer to FIGS. 1A and 1C).

The lower film FL may be disposed under the display panel DP. The lower film FL may reduce stress applied to the display panel DP when the display device DD is folded. In addition, the lower film FL may prevent external moisture from entering the display panel DP and may absorb external impacts.

The lower film FL may include a functional layer formed on a plastic film. The functional layer may include a resin layer. The functional layer may be formed by a coating method.

The protective layer CL may be disposed under the lower film FL. The protective layer CL may include at least one functional layer that protects the display panel DP. For example, the protective layer CL may include a light shielding layer, a heat dissipating layer, a cushion layer, and a plurality of adhesive layers, however, the specific configuration should not be limited thereto or thereby. That is, at least one of the light shielding layer, the heat dissipating layer, and the cushion layer may be omitted, and a plurality of layers may be provided as a single layer.

The components included in the display device DD may be coupled to each other by adhesive layers disposed between the components. Hereinafter, the adhesive layers described in the illustrated embodiments may be an optically clear adhesive (OCA) film, an optically clear resin (OCR), or a pressure sensitive adhesive (PSA) film. In addition, the adhesive layers may include a light-curable adhesive material or a heat-curable adhesive material, but should not be particularly limited.

According to an embodiment, the digitizer DZ may be disposed under the protective layer CL. The digitizer DZ may take the form of any sensor capable of sensing the signal transmitted by external input, such as the pen SP (refer to FIG. 1A). The digitizer DZ may sense the external inputs by an electromagnetic resonance (EMR) method. According to the EMR method, a resonant circuit provided in the pen SP generates a magnetic field, the vibrating magnetic field induces signals to a plurality of lines included in the digitizer DZ, and the position of the pen SP is detected based on the signals induced in the lines. One form of the digitizer DZ will be described in detail below.

Figure 2B:
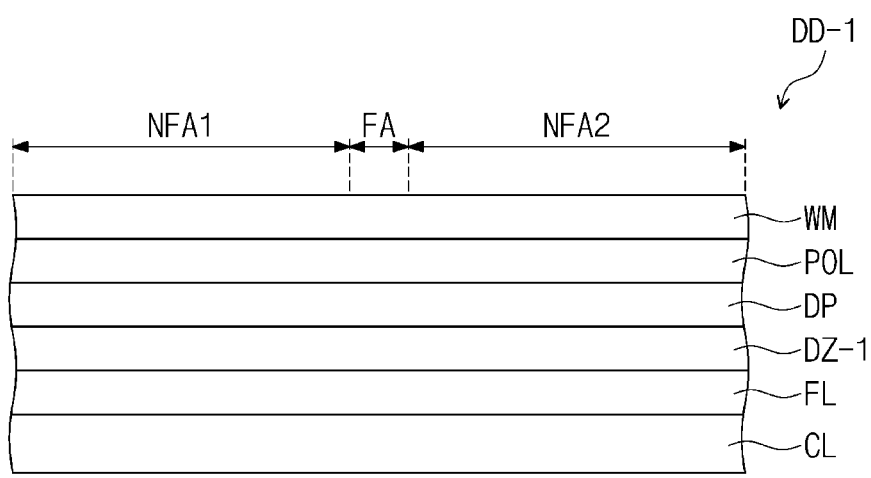
Figure 2B:
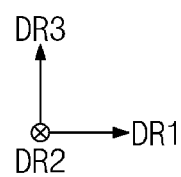

FIG. 2B is a cross-sectional view of another embodiment of a display device DD-1 of FIG. 1A.

Referring to FIG. 2B, different from the digitizer DZ shown in FIG. 2A, the digitizer DZ-1 may be disposed between a display panel DP and a lower film FL. The display devices DD and DD-1 shown in FIGS. 2A and 2B are merely examples, and the position of the digitizer DZ should not be particularly limited. As an example, the digitizer DZ may be disposed between the protective layer CL and the lower film FL.

Figure 3:
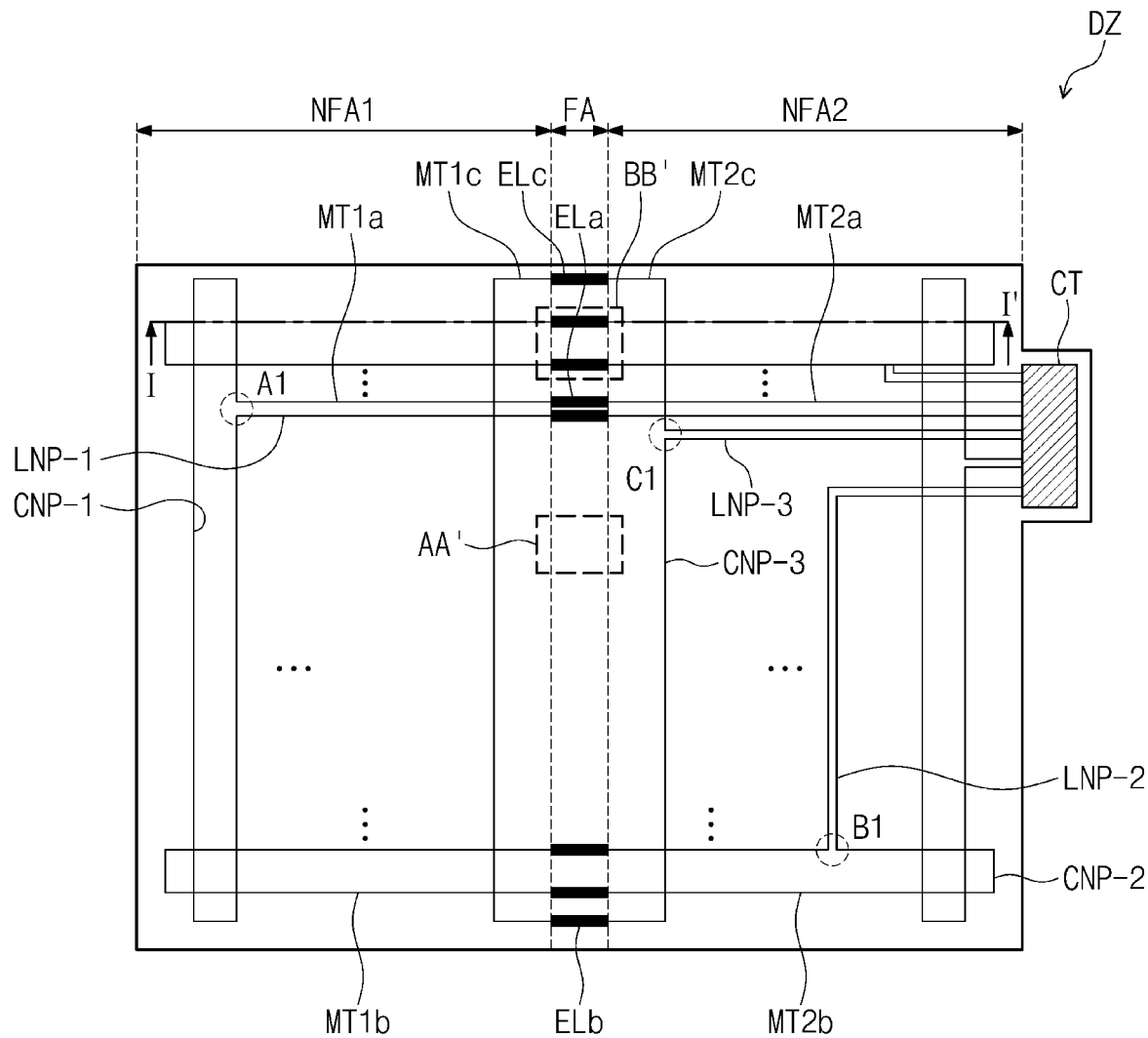
FIG. 3 is a plan view of an embodiment of a digitizer constructed according to the principles of the invention.

FIG. 3 is a plan view of an embodiment of the digitizer DZ constructed according to the principles of the invention.

Referring to FIG. 3, the digitizer DZ may include a foldable area FA, a first non-foldable area NFA1, and a second non-foldable area NFA2, which respectively correspond to the foldable area FA, the first non-foldable area NFA1, and the second non-foldable area NFA2 of the display device DD (refer to FIG. 1A).

The digitizer DZ may include a plurality of coils CN and a connector CT. Each of the coils CN may be connected to the connector CT, and the connector CT may be connected to a mother board. According to an embodiment, the connector CT may be disposed adjacent to the second non-foldable area NFA2 of the digitizer DZ.

Each of the coils CN included in the digitizer DZ may include a plurality of loop portions that may be in the form of an open loop such as coil portions CNP and a plurality of line portions that may be in the form of routing line portions LNP. The routing line portions LNP may extend from the coil portions CNP and may be connected to the connector CT. Each of the coil portions CNP may have an open loop shape. The routing line portions LNP may be connected to disconnected (open) portions of each of the coil portions CNP, which face each other. As an example, two routing line portions LNP may be connected to one coil portion CNP.

Any ones of plurality of coil portions CNP and the plurality of routing line portions LNP that overlap the first non-foldable area NFA1, the foldable area FA, and the second non-foldable area NFA2 are referred to herein as a "transverse line."

The coils CN may include a first coil CN1, a second coil CN2, and a third coil CN3. FIG. 3 shows only two first coils CN1, two second coils CN2, and one third coil CN3 as a representative example, and other first to third coils are omitted for clarity.

Some of the first coil CN1, the second coil CN2, and the third coil CN3 may be disposed on the same layer, and the other coil may be disposed on a different layer. As an example, the first coil CN1 and the third coil CN3 may be disposed on the same layer, and the second coil CN2 may be disposed on a layer different from the layer on which the first coil CN1 and the third coil CN3 are disposed. According to an embodiment, portions forming one coil may be disposed on different layers from each other. In detail, a portion of the first coil CN1 may be disposed on a layer different from a layer on which the other portion of the first coil CN1 is disposed. A portion and the other portion of each of the second coil CN2 and the third coil CN3 may be disposed on different layers from each other.

The first coil CN1 may include a first coil portion CNP-1 and a first routing line portion LNP-1. The first coil portion CNP-1 may include a long side extending in the second direction DR2, and the long side may be arranged substantially parallel to the folding axis FX (refer to FIG. 1B). In addition, the first coil portion CNP-1 may overlap the first non-foldable area NFA1 or the second non-foldable area NFA2.

The first routing line portion LNP-1 may be connected to an open (disconnected portion) A1 defined at the long side of the first coil portion CNP-1. As an example, two disconnected portions A1 facing each other may be defined at one first coil portion CNP-1, and one first coil portion CNP-1 may be connected to two first routing line portions LNP-1. The first routing line portion LNP-1 may overlap at least one of first non-foldable area NFA1, the foldable area FA, or the second non-foldable area NFA2.

A first rigid portion MT1$a$ may be defined as a portion of the first routing line portion LNP-1 that overlaps the first non-foldable area NFA1. A flexible portion ELa may be defined as a portion of the first routing line portion LNP-1 that overlaps the foldable area FA. A second rigid portion MT2$a$ may be defined as a portion of the first routing line portion LNP-1 that overlaps the second non-foldable area NFA2. The first and second rigid portions MT1$a$ and MT2$a$ and the flexible portion ELa will be described below.

The second coil CN2 may include a second coil portion CNP-2 and a second routing line portion LNP-2. The second coil portion CNP-2 may include a long side extending in the first direction DR1, and the long side may be arranged substantially perpendicular to the folding axis FX. In addition, the second coil portion CNP-2 may overlap the first non-foldable area NFA1, the foldable area FA, and the second non-foldable area NFA2.

The first rigid portion MT1$b$ may be defined as a portion of the second coil portion CNP-2 that overlaps the first non-foldable area NFA1. The flexible portion ELb may be defined as a portion of the second coil portion CNP-2 that overlaps the foldable area FA. The second rigid portion MT2$b$ may be defined as a portion of the second coil portion CNP-2 that overlaps the second non-foldable area NFA2. The first and second rigid portions MT1$b$ and MT2$b$ and the flexible portion ELb will be described in detail below.

The second routing line portion LNP-2 may be connected to a disconnected portion B1 defined at the long side of the second coil portion CNP-2. As an example, two disconnected portions B1 facing each other may be defined at one second coil portion CNP-2, and one second coil portion CNP-2 may be connected to two second routing line portions LNP-2. The second routing line portion LNP-2 may overlap the second non-foldable area NFA2.

The third coil CN3 may include a third coil portion CNP-3 and a third routing line portion LNP-3. The third coil portion CNP-3 may include a long side extending in the second direction DR2, and the long side may be arranged substantially parallel to the folding axis FX. In addition, the third coil portion CNP-3 may overlap the first non-foldable area NFA1, the foldable area FA, and the second non-foldable area NFA2.

The first rigid portion MT1$c$ may be defined as a portion of the third coil portion CNP-3 that overlaps the first non-foldable area NFA1. The flexible portion ELc may be defined as a portion of the third coil portion CNP-3 that overlaps the foldable area FA. The second rigid portion MT2c may be defined as a portion of the third coil portion CNP-3 that overlaps the second non-foldable area NFA2. The first and second rigid portions MT1c and MT2c and the flexible portion ELc will be described in detail below.

The third routing line portion LNP-3 may be connected to a disconnected portion Cl defined at the long side of the third coil portion CNP-3. As an example, two disconnected portions Cl facing each other may be defined at one third coil portion CNP-3, and one third coil portion CNP-3 may be connected to two third routing line portions LNP-3. The third routing line portion LNP-3 may overlap the second non-foldable area NFA2.

The first rigid portion MT1 (MT1a, MT1b, and MT1c) and the second rigid portion MT2 (MT2a, MT2b, and MT2c) may respectively overlap the first and second non-foldable areas NFA1 and NFA2, and the flexible portion EL (ELa, ELb, and ELc) may overlap the foldable area FA. In addition, the flexible portion EL (ELa, ELb, and ELc) may be disposed between the first rigid portion MT1 (MT1a, MT1b, and MT1c) and the second rigid portion MT2 (MT2a, MT2b, and MT2c). The first and second rigid portions MT1 and MT2 and the flexible portion EL are described with first, second, and third coils CN1, CN2, and CN3 as examples, however, they should not be limited thereto or thereby. According to an embodiment, the above descriptions of the first and second rigid portions MT1 and MT2 and the flexible portion EL may be applied to any coil including a portion that extends across the foldable area FA.

The flexible portion EL may include a plurality of flexible lines formed by printing a flexible pattern between the first and second rigid portions MT1 and MT2 and irradiating a laser beam to the flexible pattern. A method of forming the flexible portion EL will be described in detail below.

The first and second rigid portions MT1 and MT2 may include a material different from that of the flexible portion EL. The first and second rigid portions MT1 and MT2 may include copper. The flexible portion EL may include a flexible conductor. The flexible conductor may include a conductive filler and a flexible polymer. As the flexible portion EL includes the conductive filler, the flexible portion EL may have an electrical conductivity, and as the flexible portion EL includes the flexible polymer, the flexible portion EL may have an elasticity.

The conductive filler may include at least one of copper, silver, and graphite. The flexible polymer may include at least one of a styrene-butadiene rubber, a butadiene rubber, a butyl rubber, a silicone rubber, and a urethane rubber. The flexibility and resistivity of the flexible portion may be determined by the proportion of the conductive filler and the flexible polymer. As the proportion of the flexible polymer increases, the flexibility of the flexible portion EL may increase, and the resistivity of the flexible portion EL may increase.

The flexibility of the flexible portion EL may be between about 2% and about 50%. In a case where the flexibility of the flexible portion EL is smaller than about 2%, the elasticity may be insufficient, and the lines overlapping the foldable area FA may not be prevented from being damaged when the flexible portion EL is folded repeatedly.

The flexible portion EL may have a volume resistance between about $1 \times 10^{-7}$ Ωcm and about $1 \times 10^{-4}$ Ωcm. In a case where the volume resistance is smaller than substantially $1 \times 10^{-7}$ Ωcm, the proportion of the flexible polymer decreases, and thus, the flexible portion EL may not have the elasticity sufficient to prevent the lines from being damaged, and in a case where the volume resistance is greater than substantially $1 \times 10^{-4}$ Ωcm, the electrical conductivity may decrease, and thus, the external input may not be sensed.

According to the illustrated embodiment, as the lines extending in the first direction DR1 include the flexible portion EL having large flexibility and small volume resistance in the portion overlapping the foldable area FA, cracks occurring on the lines due to a tensile stress applied thereto when the display device DD (refer to FIG. 1A) is folded may be reduced or prevented.

Figure 4A:
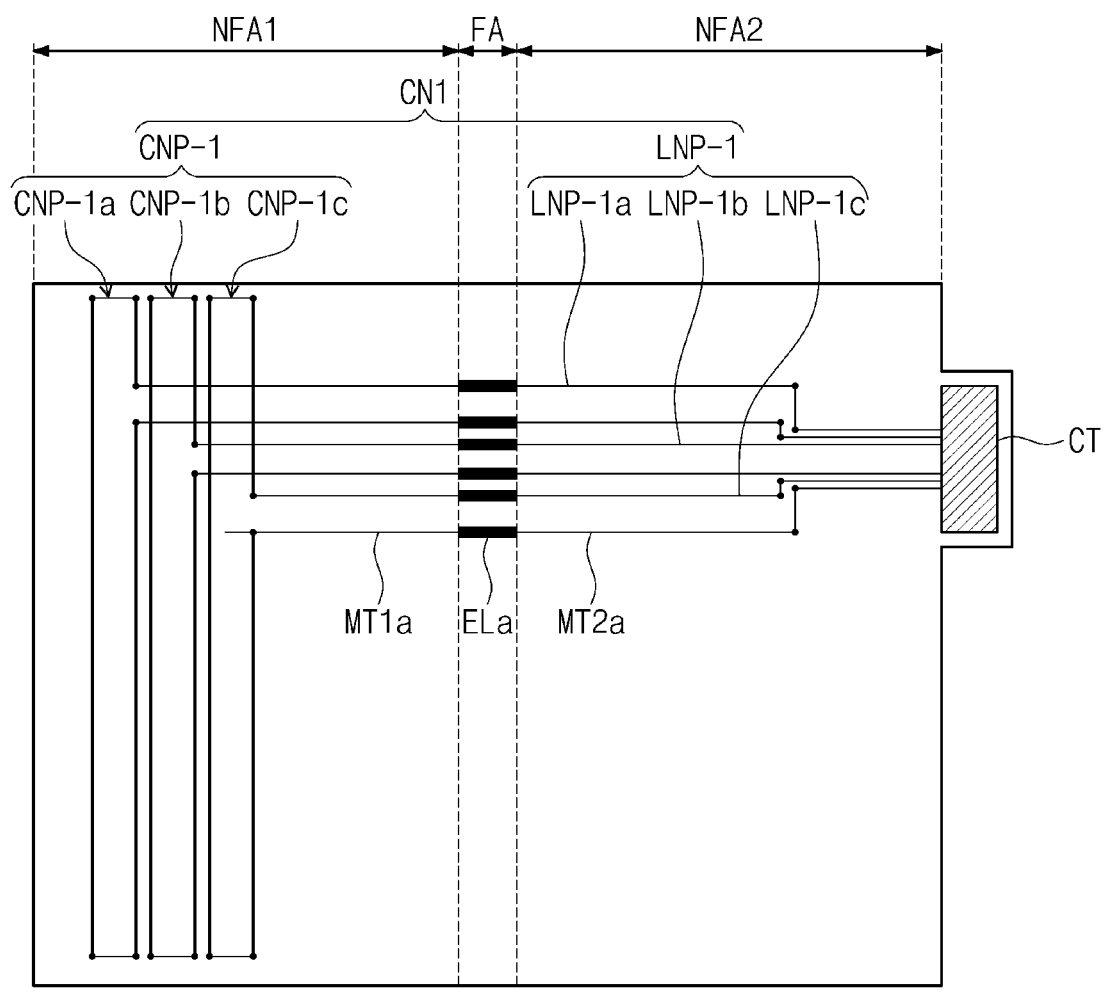
FIGS. 4A to 4C are plan views of embodiments of a portion of a coil of the digitizer of FIG. 3.

FIG. 4A is a plan view of an embodiment of a portion of the coil of the digitizer DZ of FIG. 3. FIG. 4A shows only the first coil CN1 among the coils described with reference to FIG. 3, and thus, descriptions are focused on the first coil CN1.

Referring to FIG. 4A, a plurality of first coils CN1 may be arranged in the first direction DR1. FIG. 4A shows three first coils CN1 as a representative example, however, the number of the first coils CN1 should not be limited to three. According to an embodiment, the first coils CN1 may include n (n is a natural number) coils arranged spaced apart from each other in the first direction DR1.

The first coils CN1 may include first coil portions CNP-1 and first routing line portions LNP-1. FIG. 4A shows three first coil portions CNP-1a, CNP-1b, and CNP-1c and six first routing line portions LNP-1a, LNP-1b, and LNP-1c connected to the three first coil portions CNP-1a, CNP-1b, and CNP-1c.

Each of the three first coil portions CNP-1a, CNP-1b, and CNP-1c may include a long side extending in the second direction DR2, and the long side may be arranged substantially parallel to the folding axis FX (refer to FIG. 1B). In addition, the three first coil portions CNP-1a, CNP-1b, and CNP-1c may overlap the first non-foldable area NFA1.

The six first routing line portions LNP-1a, LNP-1b, and LNP-1c may overlap the first non-foldable area NFA1, the foldable area FA, and the second non-foldable area NFA2. Each of the six first routing line portions LNP-1a, LNP-1b, and LNP-1c may include a first rigid portion MT1a overlapping the first non-foldable area NFA1, a flexible portion ELa overlapping the foldable area FA, and a second rigid portion MT2a overlapping the second non-foldable area NFA2.

When viewed in plan, the first routing line portion LNP-1a may overlap two first coil portions CNP-1b and CNP-1c, however, the lines may not be in contact with each other since the first routing line portion LNP-1a and the first coil portions CNP-1b and CNP-1c are disposed on different layers. That is, the first routing line portion LNP-1a may be insulated from the two first coil portions CNP-1b and CNP-1c.

Figure 4B:
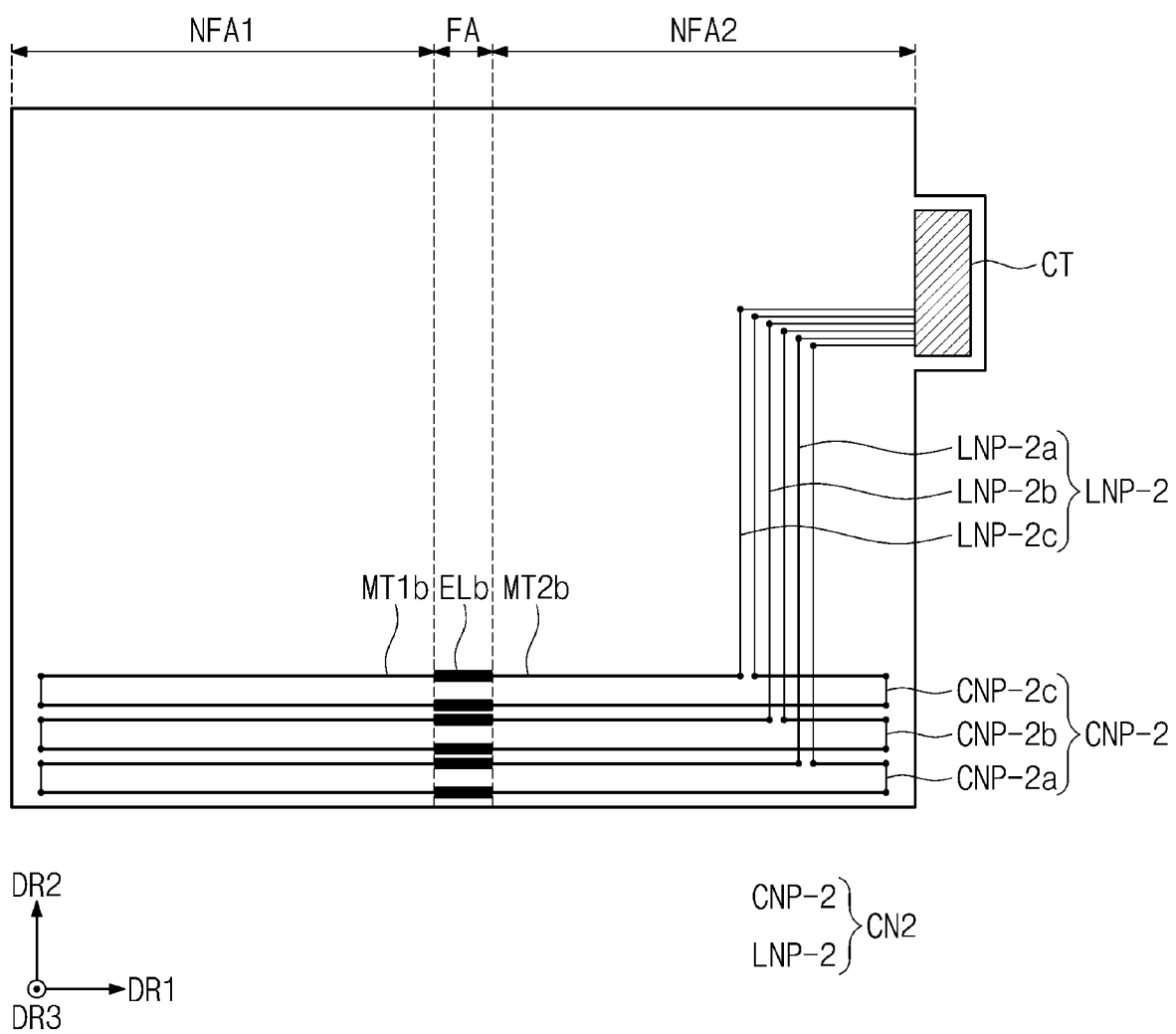

FIG. 4B is a plan view of another embodiment of a portion of the coil of the digitizer DZ of FIG. 3. FIG. 4B shows only the second coil CN2 among the coils described with reference to FIG. 3, and thus, descriptions are focused on the second coil CN2.

Referring to FIG. 4B, a plurality of second coils CN2 may be arranged in the second direction DR2. FIG. 4B shows three second coils CN2 as a representative example, however, the number of the second coils CN2 should not be limited to three. According to an embodiment, the second coil CN2 may include n (n is a natural number) coils arranged spaced apart from each other in the second direction DR2.

The second coils CN2 may include second coil portions CNP-2 and second routing line portions LNP-2. FIG. 4B shows three second coil portions CNP-2a, CNP-2b, and CNP-2c and six second routing line portions LNP-2a, LNP- 2b, and LNP-2c connected to the three second coil portions CNP-2a, CNP-2b, and CNP-2c Each of the three second coil portions CNP-2a, CNP-2b, and CNP-2c may include a long side extending in the first direction DR1, and the long side may be disposed substantially perpendicular to the folding axis FX (refer to FIG. 1B). In addition, the three second coil portions CNP-2a, CNP-2b, and CNP-2c may overlap the first non-foldable area NFA1, the foldable area FA, and the second non-foldable area NFA2. Each of the three second coil portions CNP-2a, CNP-2b, and CNP-2c may include a first rigid portion MT1b overlapping the first non-foldable area NFA1, a flexible portion ELb overlapping the foldable area FA, and a second rigid portion MT2b overlapping the second non-foldable area NFA2.

The six second routing line portions LNP-2a, LNP-2b, and LNP-2c may overlap the second non-foldable area NFA2.

When viewed in plan, although the second routing line portion LNP-2a may overlap two second coil portions CNP-2b and CNP-2c, the lines may not be in contact with each other since the second routing line portion LNP-2a and the second coil portions CNP-2b and CNP-2c are disposed on different layers. That is, the second routing line portion LNP-2a may be insulated from the two second coil portions CNP-2b and CNP-2c.

Figure 4C:
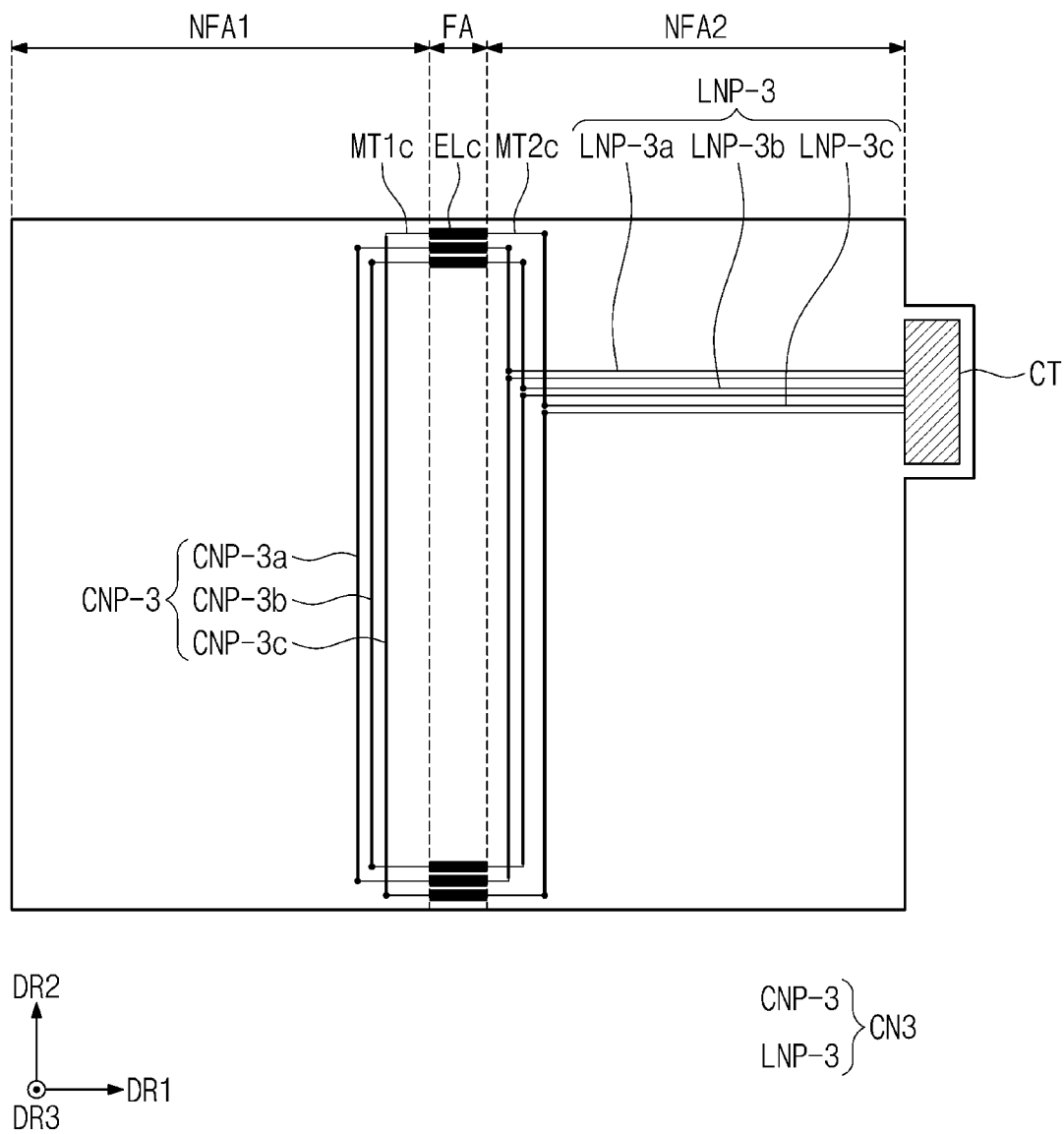

FIG. 4C is a plan view of still another embodiment of a portion of the coil of the digitizer DZ of FIG. 3. FIG. 4C shows only the third coil CN3 among the coils described with reference to FIG. 3, and thus, descriptions are focused on the third coil CN3.

Referring to FIG. 4C, a plurality of third coils CN3 may be arranged in the first direction DR1. FIG. 4C shows three third coils CN3 as a representative example, however, the number of the third coils CN3 should not be limited to three. According to an embodiment, the third coil CN3 may include n (n is a natural number) coils arranged spaced apart from each other in the first direction DR1.

The third coils CN3 may include third coil portions CNP-3 and third routing line portions LNP-3. FIG. 4C shows three third coil portions CNP-3a, CNP-3b, and CNP-3c and six third routing line portions LNP-3a, LNP-3b, and LNP-3c connected to the three third coil portions CNP-3a, CNP-3b, and CNP-3c.

Each of the three third coil portions CNP-3a, CNP-3b, and CNP-3c may include a long side extending in the second direction DR2, and the long side may be arranged substantially parallel to the folding axis FX (refer to FIG. 1B). In addition, the three third coil portions CNP-3a, CNP-3b, and CNP-3c may overlap the first non-foldable area NFA1, the foldable area FA, and the second non-foldable area NFA2. Each of the three third coil portions CNP-3a, CNP-3b, and CNP-3c may include a first rigid portion MT1c overlapping the first non-foldable area NFA1, a flexible portion ELc overlapping the foldable area FA, and a second rigid portion MT2c overlapping the second non-foldable area NFA2.

The six third routing line portions LNP-3a, LNP-3b, and LNP-3c may overlap the second non-foldable area NFA2.

When viewed in plan, although the third routing line portion LNP-3a may overlap two third coil portions CNP-3b and CNP-3c, the lines may not be in contact with each other since the third routing line portion LNP-3a and the third coil portions CNP-3b and CNP-3c are disposed on different layers. That is, the third routing line portion LNP-3a may be insulated from the two third coil portions CNP-3b and CNP-3c.

Figure 5:
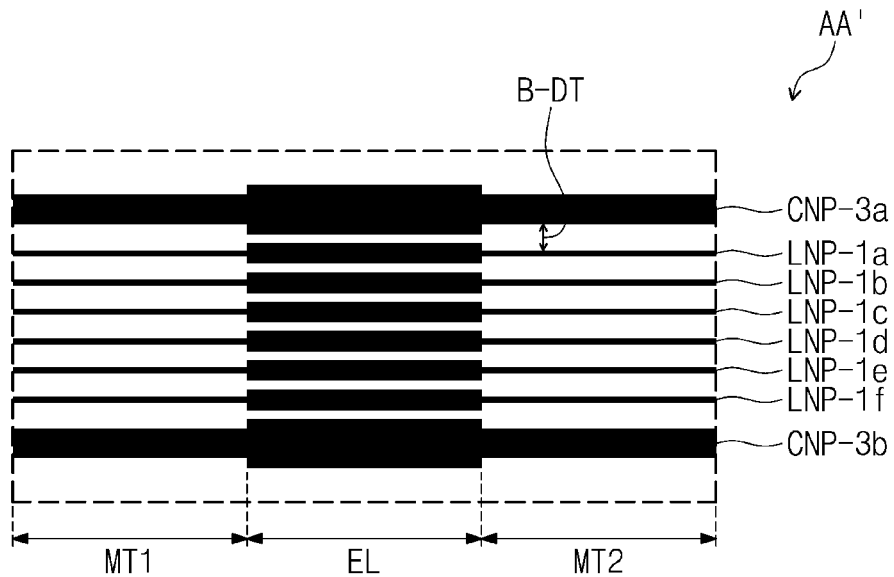
FIG. 5 is an enlarged view of an area AA' of FIG. 3.
Figure 6:
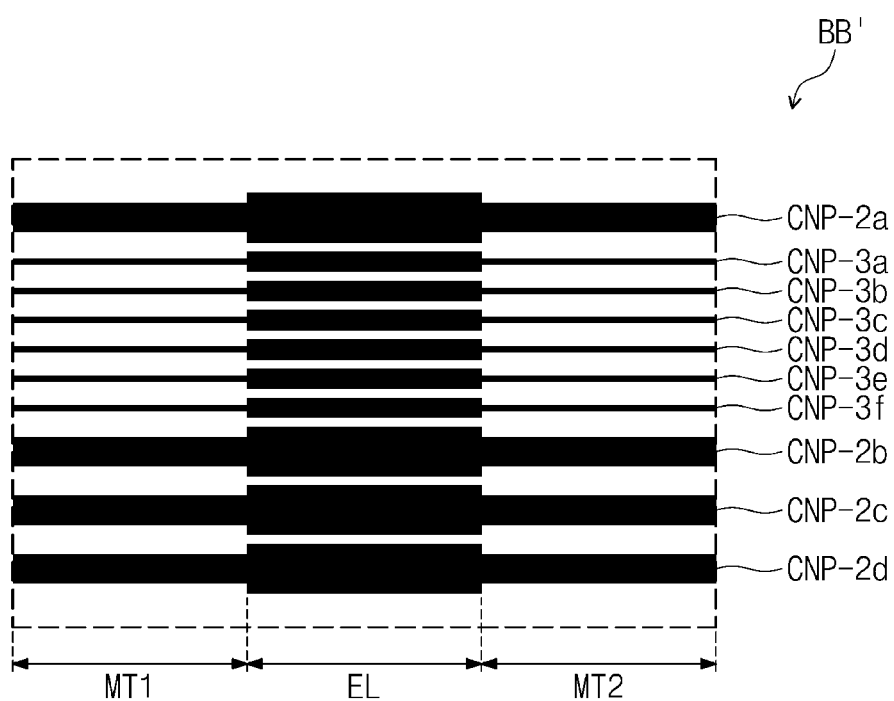
FIG. 6 is an enlarged view of an area BB' of FIG. 3.

FIG. 5 is an enlarged view of an area AA' of the digitizer DZ shown in FIG. 3. FIG. 6 is an enlarged view of an area BB' of the digitizer DZ shown in FIG. 3.

In FIG. 5, first routing line portions LNP-1a, LNP-1b, LNP-1c, LNP-1d, LNP-1e, and LNP-1f may be densely arranged between third coil portions CNP-3a and CNP-3b. The third coil portions CNP-3a and CNP-3b may have a width greater than a width of the first routing line portions LNP-1a, LNP-1b, LNP-1c, LNP-1d, LNP-1e, and LNP-1f.

In FIG. 6, third coil portions CNP-3a, CNP-3b, CNP-3c, CNP-3d, CNP-3e, and CNP-3f may be densely arranged between a second coil portion CNP-2a and second coil portions CNP-2b, CNP-2c, and CNP-2d. The second coil portions CNP-2a, CNP-2b, CNP-2c, CNP-2d may have a width greater than a width of the third coil portions CNP-3a, CNP-3b, CNP-3c, CNP-3d, CNP-3e, and CNP-3f.

In a case where the lines are densely arranged, the distance B-DT between the first rigid portions MT1 adjacent to each other or a distance B-DT between the second rigid portions MT2 adjacent to each other may be equal to or smaller than substantially 200 micrometers, and the distance between the flexible portions EL having a width greater than the width of the first and second rigid portions MT1 and MT2 may be formed by a laser process.

According to an embodiment, the flexible lines may be formed by printing a flexible pattern (paste) on a portion in which the lines are densely arranged as shown in FIGS. 5 and 6 and irradiating a laser beam on a portion of the flexible pattern. It is possible to form an optimal interval distance (fine pitch) in the portion in which the lines are densely arranged through the laser irradiation, and thus, a fine patterning is possible. Accordingly, line disconnections may be reduced, and a movement of input devices such as the pen SP (refer to FIG. 1A) may be detected precisely.

FIG. 5 shows a structure in which the first routing line portions LNP-1a, LNP-1b, LNP-1c, LNP-1d, LNP-1e, and LNP-1f are densely arranged, and FIG. 6 shows a structure in which the third coil portions CNP-3a, CNP-3b, CNP-3c, CNP-3d, CNP-3e, and CNP-3f are densely arranged, however, the embodiments should not be limited thereto or thereby. As an example, in the case where the routing line portions LNP (refer to FIG. 3) and the coil portions CNP (refer to FIG. 3) are densely arranged, the flexible portion EL may be formed through the method described above.

Figure 7:
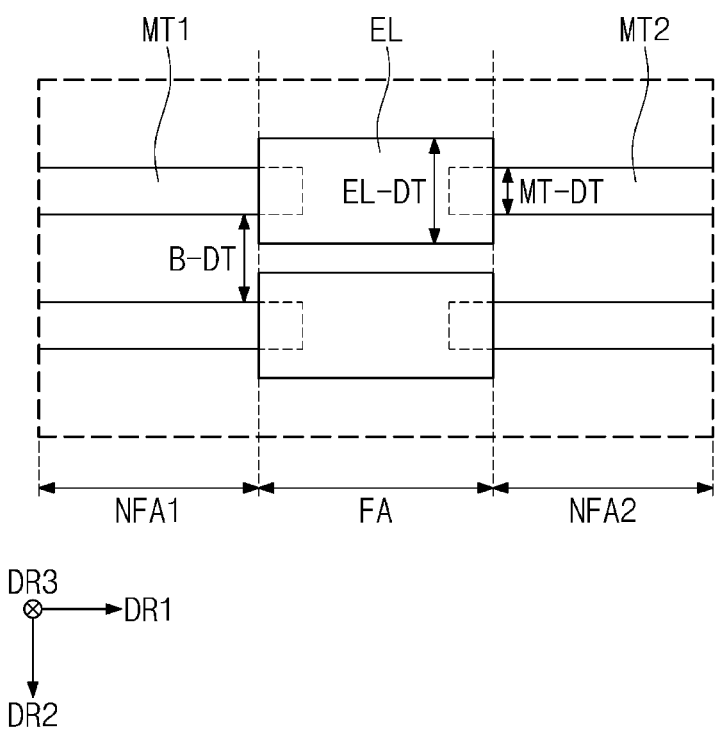
FIG. 7 is an enlarged view of a portion of the digitizer of FIG. 3.

FIG. 7 is an enlarged view of a portion of the digitizer DZ of FIG. 3.

Referring to FIG. 7, the width EL-DT of the flexible portion EL may be greater than the width MT-DT of each of the first and second rigid portions MT1 and MT2. Since the flexible portion EL has a relatively low volume resistance, less electricity flows, and thus, the flexible portion EL is required to be thick. In addition, in a process of forming the flexible portion EL, the flexible portion EL is required to be thick since a printing position of the flexible pattern (paste) may be unstable when printing the flexible pattern (paste). Accordingly, the difference between the width EL-DT of the flexible portion EL and the width MT-DT of each of the first and second rigid portions MT1 and MT2 may be between about 50 micrometers and about 200 micrometers.

When the width MT-DT of the first rigid portions MT1 or the width MT-DT of the second rigid portions MT2 is equal to or smaller than substantially 200 micrometers, the lines may be densely arranged. When the lines are densely arranged, the reliability of the digitizer DZ with respect to the input sensing of the pen SP (refer to FIG. 1A) may be improved.

Figure 8A:
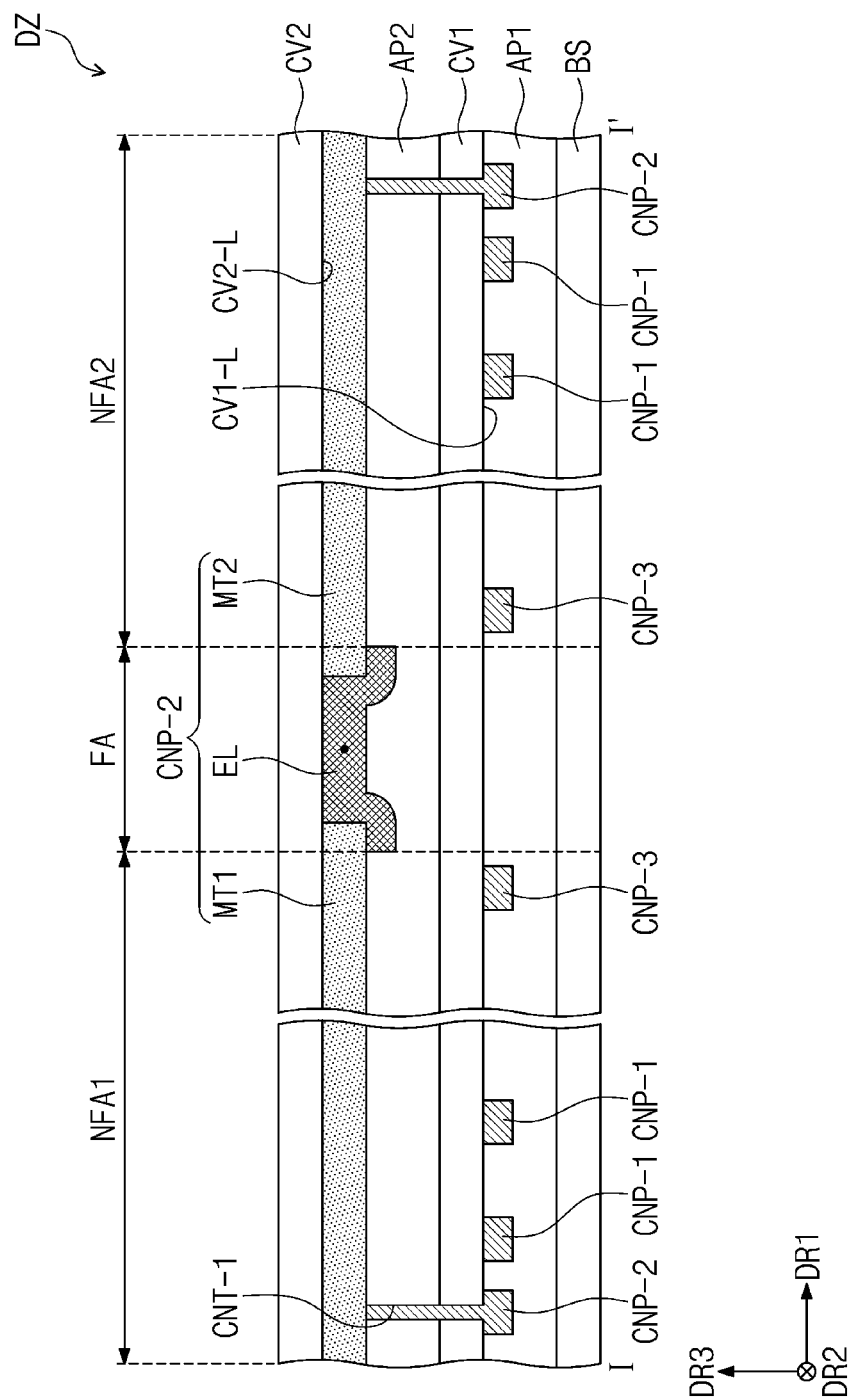
FIG. 8A is a cross-sectional view of an embodiments of the digitizer taken along a line I-I' of FIG. 3.

FIG. 8A is a cross-sectional view of an embodiment of the digitizer DZ taken along a line I-I' of FIG. 3.

Referring to FIG. 8A, the digitizer DZ may include a base layer BS, a first adhesive layer AP1, a first cover layer CV1, a second adhesive layer AP2, and a second cover layer CV2. The base layer BS, the first adhesive layer AP1, the first cover layer CV1, the second adhesive layer AP2, and the second cover layer CV2 may be stacked in the third direction DR3. In this case, the base layer BS, the first adhesive layer AP1, the first cover layer CV1, the second adhesive layer AP2, and the second cover layer CV2 may be stacked in an order from the second cover layer CV2 to the base layer BS, that is, along a direction opposite to the third direction DR3 while being manufactured.

According to an embodiment, each of the base layer BS, the first cover layer CV1, and the second cover layer CV2 may include a polymer resin. As an example, each of the base layer BS, the first cover layer CV1, and the second cover layer CV2 may include polyimide.

Referring to FIGS. 3 and 8A, the long side of the second coil CN2 may be disposed between the first cover layer CV1 and the second cover layer CV2. According to an embodiment, the long side of the second coil CN2 may be disposed on a rear surface CV2-L of the second cover layer CV2, which faces the first cover layer CV1

The long side of the second coil CN2 may include the first and second rigid portions MT1 and MT2 and the flexible portion EL. Both ends of the flexible portion EL may respectively cover one end of the first rigid portion MT1 disposed to overlap the first non-foldable area NFA1 and one end of the second rigid portion MT2 disposed to overlap the second non-foldable area NFA2. Accordingly, the step difference may be formed at both ends of the flexible portion EL.

The second adhesive layer AP2 may be disposed between the first cover layer CV1 and the second cover layer CV2 and may cover the long side of the second coil CN2.

A short side of the second coil CN2, the long side of the first coil CN1, and the long side of the third coil CN3 may be disposed between the base layer BS and the first cover layer CV1. Accordingly to an embodiment, the short side of the second coil CN2, the long side of the first coil CN1, and the long side of the third coil CN3 may be disposed on a rear surface CV1-L of the first cover layer CV1, which faces the base layer BS.

The first adhesive layer AP1 may be disposed between the base layer BS and the first cover layer CV1 and may cover the short side of the second coil CN2, the long side of the first coil CN1, and the long side of the third coil CN3.

The short side of the second coil CN2 may be disposed on the rear surface CV1-L of the first cover layer CV1. The short side of the second coil CN2 may be disposed on a layer different from a layer on which the long side of the second coil CN2 is disposed, and the long side and the short side may be connected to each other via a contact hole CNT-1 defined through the first cover layer CV1 and the second adhesive layer AP2. FIG. 8A shows a structure in which the long side and the short side of the second coil CN2 are disposed on different layers as a representative example, however, this structure should not be limited to the second coil CN2. When designing the lines, the long side and the short side of each of the coils CN1, CN2, and CN3 may be arranged on different layers to prevent a short circuit between the lines.

Figure 8B:
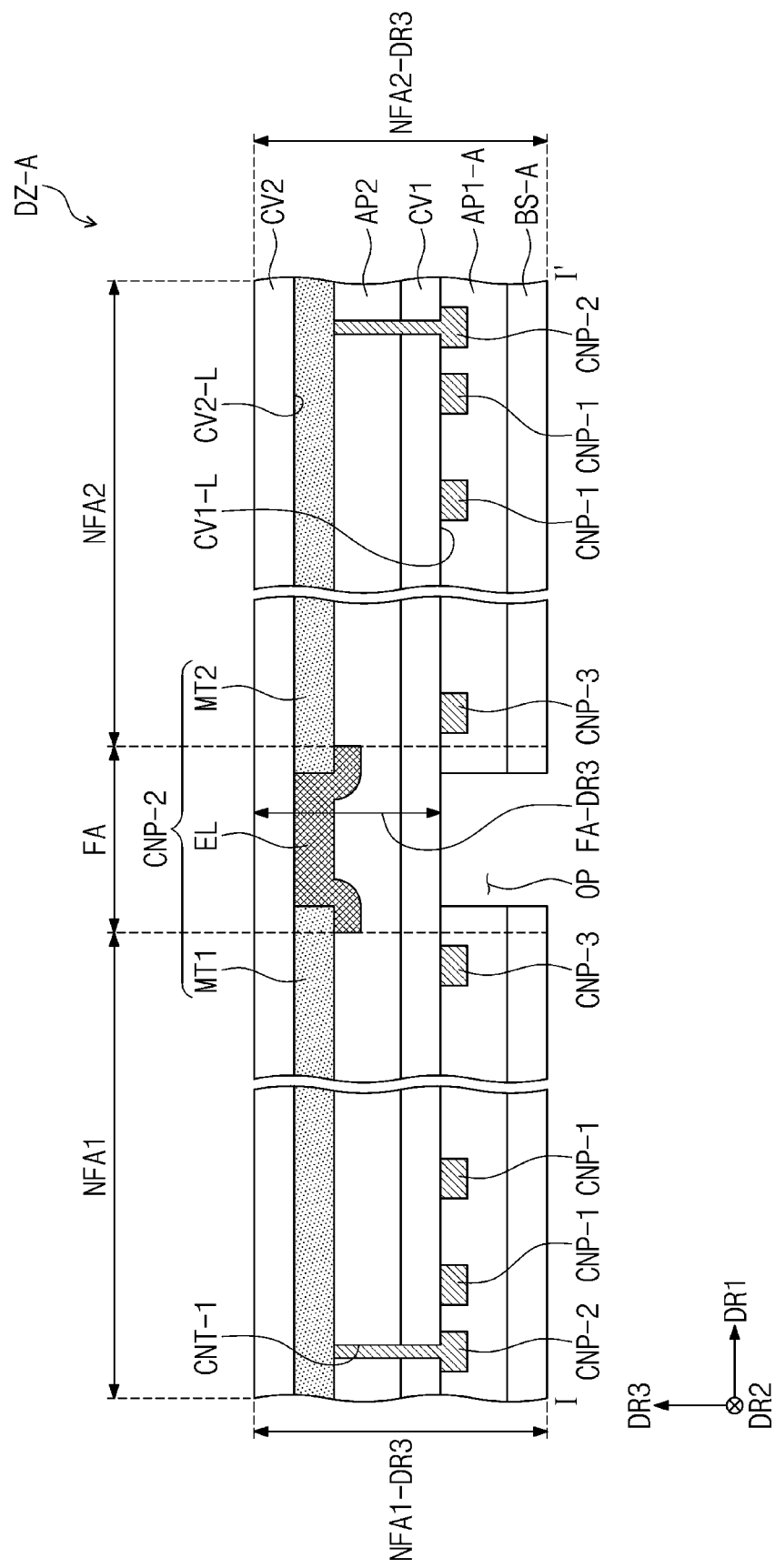
FIG. 8B is a cross-sectional view of another embodiment of the digitizer taken along a line I-I' of FIG. 3.

FIG. 8B is a cross-sectional view of another embodiment of the digitizer DZ-A taken along a line I-I' of FIG. 3. Different from the digitizer DZ shown in FIG. 8A, the digitizer DZ-A shown in FIG. 8B is provided with a folding opening OP defined under a first cover layer CV1. In FIG. 8B, the same reference numerals denote the same elements in FIG. 8A, and thus, detailed descriptions of the same elements will be omitted to avoid redundancy.

Referring to FIG. 8B, the digitizer DZ-A may include a base layer BS-A and a first adhesive layer AP1-A, which are provided with the folding opening OP overlapping the foldable area FA. The folding opening OP may be defined by openings respectively formed through the base layer BS-A and the first adhesive layer AP1-A. In this case, a portion of a rear surface of the first cover layer CV1 may be exposed without being covered by the base layer BS-A and the first adhesive layer AP1-A. The thickness FA-DR3 of a portion of the digitizer DZ-A that overlaps the foldable area FA may be smaller than thicknesses NFA1-DR3 and NFA2-DR3 of portions of the digitizer DZ-A that respectively overlap the first non-foldable area NFA1 and the second non-foldable area NFA2.

According to an embodiment, as the folding opening OP is defined, the thickness of the digitizer DZ-A overlapping the foldable area FA may be reduced, and thus, the rigidity of the foldable area FA may be lowered. Accordingly, the digitizer DZ-A may be easily folded, and cracks occurring in the lines by a tensile stress generated when the digitizer DZ-A is folded may be reduced or prevented.

Figure 8C:
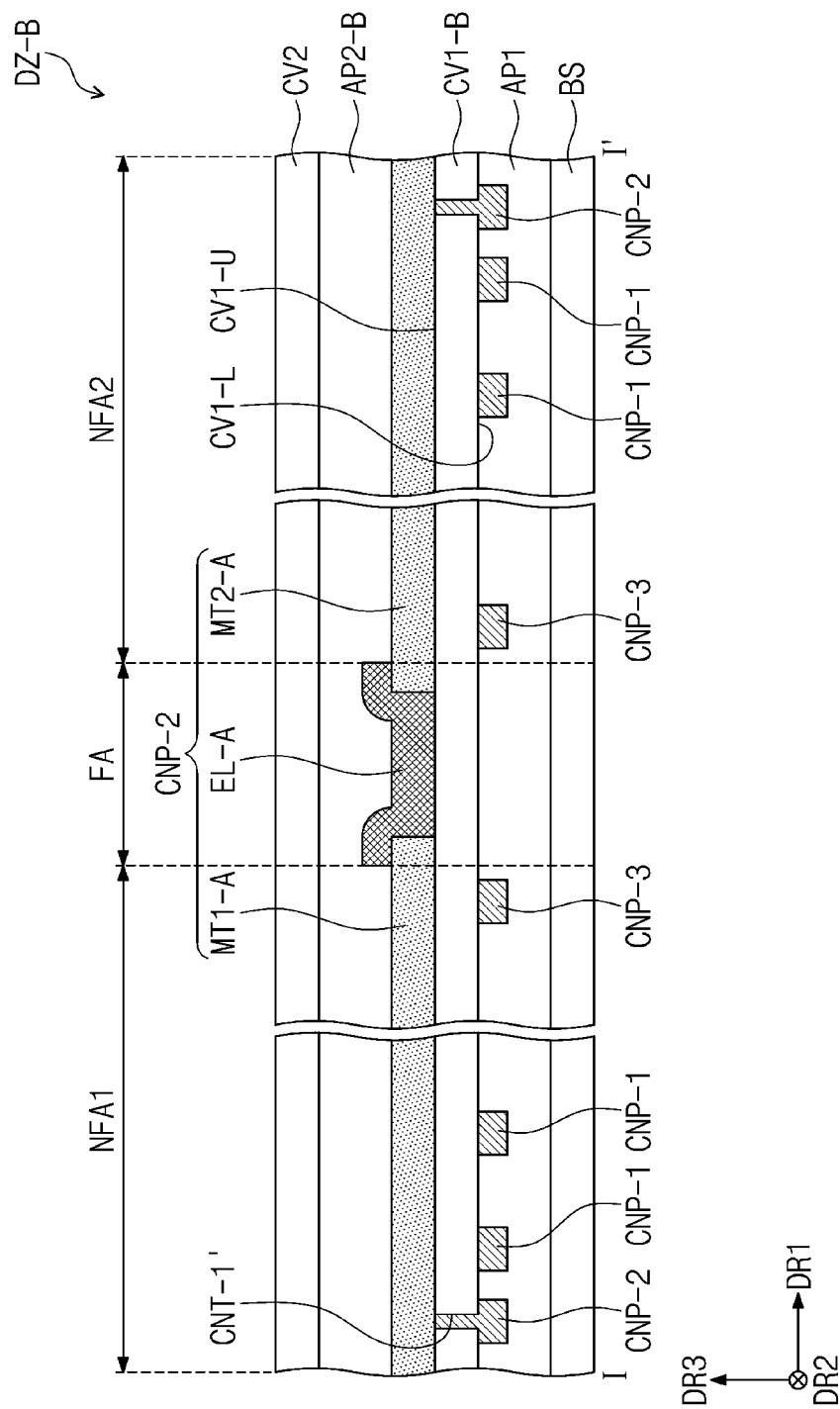
FIG. 8C is a cross-sectional view of still another embodiment of the digitizer taken along a line I-I' of FIG. 3.

FIG. 8C is a cross-sectional view of still another embodiment of the digitizer DZ-B taken along a line I-I' of FIG. 3. Different from the digitizer DZ shown in FIG. 8A, a coil portion CNP (refer to FIG. 3) or a routing line portion LNP (refer to FIG. 3) extending in the second direction DR2 is disposed on an upper surface CV1-U of a first cover layer CV1-B in the digitizer DZ-B shown in FIG. 8C. In FIG. 8C, the same reference numerals denote the same elements in FIG. 8A, and thus, detailed descriptions of the same elements will be omitted to avoid redundancy.

Referring to FIG. 8C, a short side of a second coil CN2, a long side of a first coil CN1, and a long side of a third coil CN3 may be disposed on a rear surface CV1-L of the first cover layer CV1-B, and a long side of the second coil CN2 may be disposed on the upper surface CV1-U of the first cover layer CV1-B. In this case, the short side of the second coil CN2 may be connected to the long side of the second coil CN2 via a contact hole defined through the first cover layer CV1-B. A first rigid portion MT1-A, a flexible portion EL-A, and a second rigid portion MT2-A of the second coil CN2 may be disposed on the upper surface CV1-U of the first cover layer CV1-B.

As a plurality of coils is disposed on one of the upper surface CV1-U and the rear surface CV1-L of the first cover layer CV1-B, the digitizer DZ-B may be manufactured through an easier process than the digitizers DZ and DZ-A shown in FIGS. 8A and 8B.

Since the flexible portion EL provided with the step difference is disposed on the rear surface CV2-L of the second cover layer CV2 in the digitizers DZ and DZ-A shown in FIGS. 8A and 8B, the step difference of the flexible portion EL may be formed in a lower direction away from the display panel DP (refer to FIG. 2A). Accordingly, influences of the step difference of the flexible portion EL on the display panel DP may be small compared with the digitizer DZ-B shown in FIG. 8C, and thus, the surface quality of the display device DD (refer to FIG. 1A) may be improved.

Figure 9:
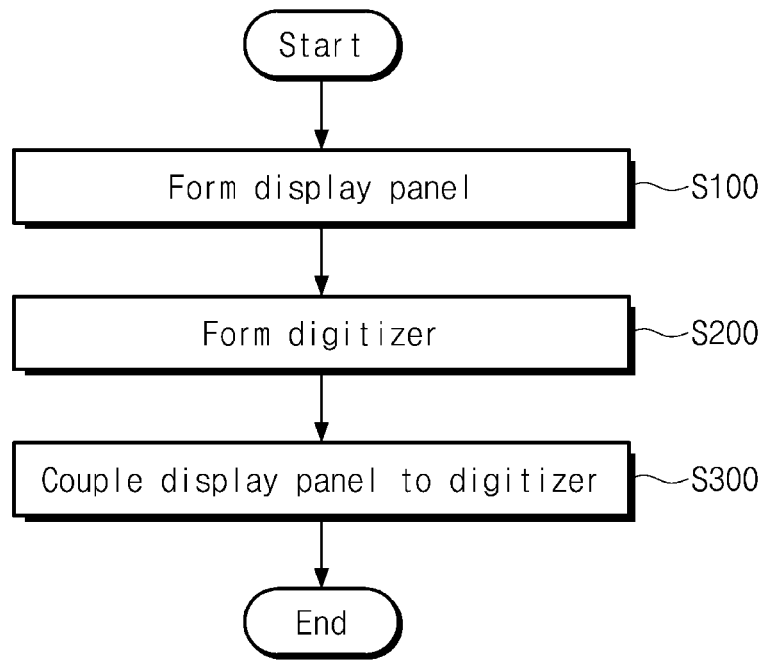
FIG. 9 is a flowchart of an embodiment of a method of manufacturing a display device according to the principles of the invention.

FIG. 9 is a flowchart of an embodiment of a method of manufacturing the display device according to the principles of the invention.

Referring to FIGS. 2A, 2B, and 9, the display panel DP may be formed (S100). The digitizer DZ may be formed (S200). The digitizer DZ may be one of the digitizers DZ, DZ-A, and DZ-B shown in FIGS. 8A to 8C. Detailed descriptions of the steps of forming of the digitizer DZ will be described with reference to FIGS. 10A to 10C. The display panel DP and the digitizer DZ may be formed through separate processes. Accordingly, the order of formation of the display panel DP and the digitizer DZ should not be particularly limited.

The digitizer DZ may be coupled to the display panel DP (S300). As the display device DD shown in FIG. 2A, the lower film FL and the protective layer CL may be sequentially attached to a lower portion of the display panel DP, and the digitizer DZ may be coupled to the protective layer CL. As the display device DD-1 shown in FIG. 2B, the digitizer DZ-1 may be directly coupled to the lower surface of the display panel DP. The digitizer DZ may be coupled to the lower film FL disposed under the display panel DP. In this case, the digitizer DZ may be disposed between the protective layer CL and the lower film FL.

Figure 10A:
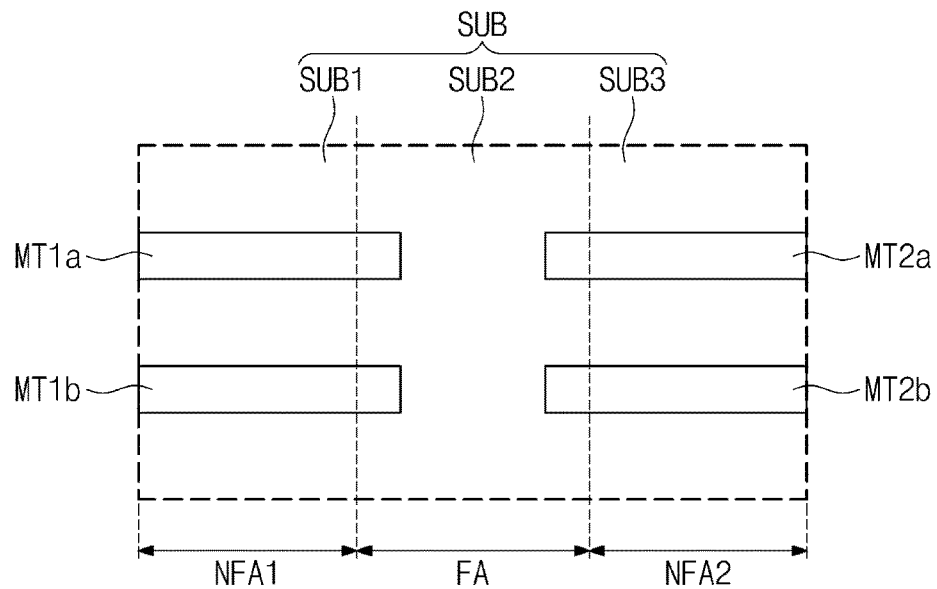
FIGS. 10A to 10C are views of a portion of the step of forming the digitizer of FIG. 9.
Figure 10A:
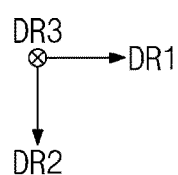
Figure 10B:
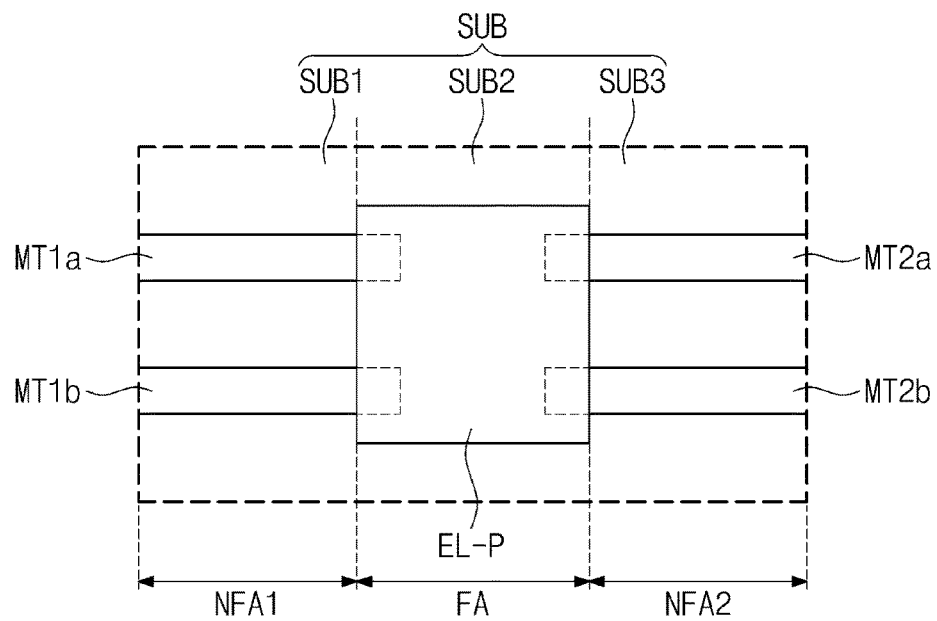
Figure 10B:
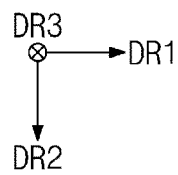
Figure 10C:
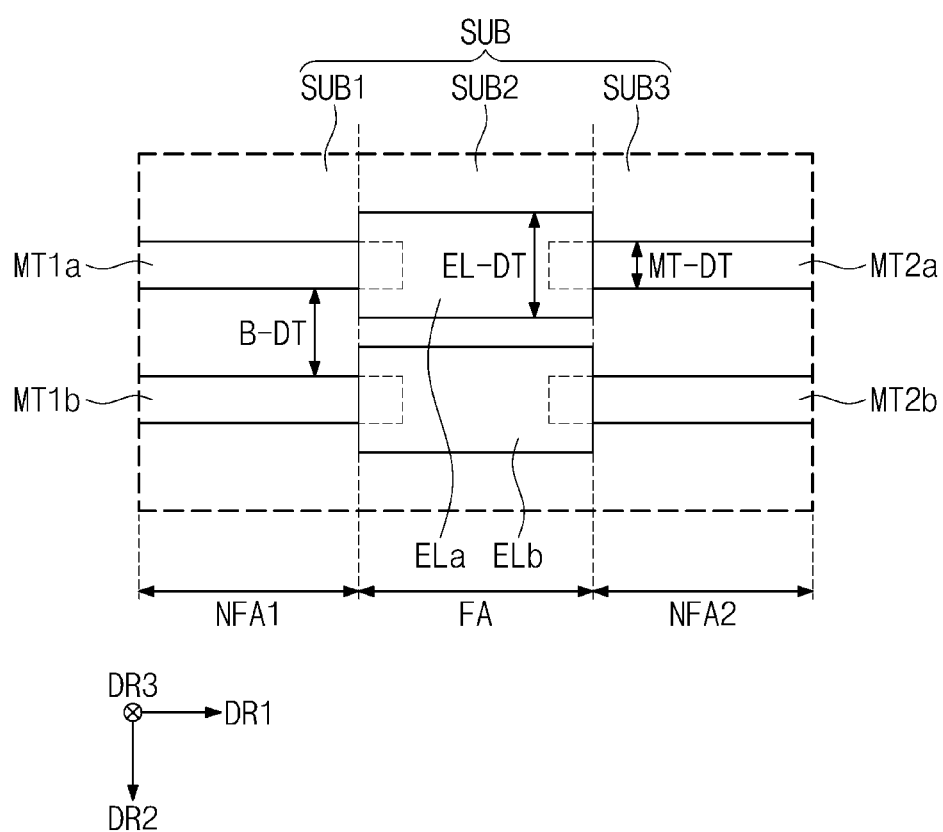

FIGS. 10A to 10C are views of a portion of the steps of forming the digitizer (S200) of FIG. 9.

Referring to FIG. 10A, a substrate SUB in which a first substrate area SUB1, a second substrate area SUB2, and a third substrate area SUB3 are defined along the first direction DR1 may be prepared. The first substrate area SUB1 may correspond to the first non-foldable area NFA1 of the display panel DP (refer to FIG. 2A), the second substrate area SUB2 may correspond to the foldable area FA of the display panel DP (refer to FIG. 2A), and the third substrate area SUB3 may correspond to the second non-foldable area NFA2 of the display panel DP (refer to FIG. 2A).

A plurality of first rigid lines MT1a and MT1b may be formed in the first substrate area SUB1. Each of the first rigid lines MT1a and MT1b may correspond to the first rigid portion MT1 (refer to FIG. 7) described above. The first rigid lines MT1a and MT1b may include a first-a rigid line MT1a and a first-b rigid line MT1b.

A plurality of second rigid lines MT2a and MT2b may be formed in the third substrate area SUB3. Each of the second rigid lines MT2a and MT2b may correspond to the second rigid portion MT2 (refer to FIG. 7) described above. The second rigid lines MT2a and MT2b may include a second-a rigid line MT2a and a second-b rigid line MT2b.

Referring to FIG. 10B, a flexible pattern EL-P may be printed in the second substrate area SUB2. The flexible pattern EL-P may cover portions of the first rigid lines MT1a and MT1b and the second rigid lines MT2a and MT2b. The flexible pattern EL-P may include the flexible conductor. The flexible conductor may include the conductive filler and the flexible polymer. As the flexible pattern EL-P includes the conductive filler, the flexible pattern EL-P may have the electrical conductivity, and as the flexible pattern EL-P includes the flexible polymer, the flexible pattern EL-P may have the elasticity.

The conductive filler may include at least one of copper, silver, and graphite. The flexible polymer may include at least one of a styrene-butadiene rubber, a butadiene rubber, a butyl rubber, a silicone rubber, and a urethane rubber. The flexibility and resistivity of the flexible pattern EL-P may be determined by the proportion of the conductive filler and the flexible polymer. As the proportion of the flexible polymer increases, the flexibility of the flexible pattern EL-P may increase, and the resistivity may increase.

Referring to FIG. 10C, the laser beam may be irradiated onto the flexible pattern EL-P (refer to FIG. 10B) to form a plurality of flexible lines ELa and ELb in the second substrate area SUB2. Each of the flexible lines ELa and ELb may correspond to the flexible portion EL (refer to FIG. 7) described above. The flexible lines ELa and ELb may include a first flexible line ELa and a second flexible line ELb.

The first flexible line ELa may be connected to the first-a rigid line MT1a corresponding to the first flexible line ELa among the first rigid lines MT1a and MT1b and the second-a rigid line MT2a corresponding to the first flexible line ELa among the second rigid lines MT2a and MT2b. The second flexible line ELb may be connected to the first-b rigid line MT1b corresponding to the second flexible line ELb among the first rigid lines MT1a and MT1b and the second-b rigid line MT2b corresponding to the second flexible line ELb among the second rigid lines MT2a and MT2b. The first flexible line ELa and the second flexible line ELb may overlap the foldable area FA.

In a case where the lines are densely arranged, the distance B-DT between the first rigid lines MT1a and MT1b or the distance B-DT between the second rigid lines MT2a and MT2b may be equal to or smaller than substantially 200 micrometers.

According to the illustrated embodiment, as portions of the lines disposed in the foldable area FA of the digitizer DZ are provided as the flexible lines ELa and ELb, the folding reliability of the digitizer DZ may be improved. In addition, although a position error occurs when printing the flexible pattern EL-P, the printing tolerance may be compensated for since the flexible lines ELa and ELb are formed by patterning the flexible pattern EL-P using the laser beam. Accordingly, the manufacturing process of the digitizer DZ may become easier. In addition, as the flexible pattern EL-P is patterned by the laser beam and the flexible lines ELa and ELb are formed, the distance between the flexible lines ELa and ELb may be precisely controlled. Accordingly, the flexible lines ELa and ELb spaced apart from each other at the fine distance may be formed in the area where the lines are densely arranged.

The width EL-DT of each of the flexible lines ELa and ELb may be greater than the width MT-DT of each of the first rigid lines MT1a and MT1b or the width MT-DT of each of the second rigid lines MT2a and MT2b. Since the flexible lines ELa and ELb have a relatively low volume resistance, less electricity flows, and thus, the flexible lines ELa and ELb are required to be thick. In addition, in a process of forming the flexible lines ELa and ELb, the flexible lines ELa and ELb are required to be thick since the printing position of the flexible pattern (paste) may be unstable when printing the flexible pattern (paste). Accordingly, the laser beam may be irradiated such that the difference between the width EL-DT of the flexible lines ELa and ELb and the width MT-DT of each of the first and second rigid portions is between about 50 micrometers and about 200 micrometers.

The flexibility of the flexible lines ELa and ELb may be between about 2% and about 50%. In a case where the flexibility of the flexible lines ELa and ELb are smaller than about 2%, the elasticity may be insufficient, and the lines overlapping the foldable area FA may not be prevented from being damaged when the flexible lines ELa and ELb are folded.

The flexible lines ELa and ELb may have a volume resistance between about $1 \times 10^{-7}$ Ωcm and about $1 \times 10^{-4}$ Ωcm. In a case where the volume resistance is smaller than about $1 \times 10^{-7}$ Ωcm, the proportion of the flexible polymer decreases, and thus, the flexible lines ELa and ELb may not have the elasticity sufficient to prevent the lines from being damaged, and in a case where the volume resistance is greater than about $1 \times 10^{-4}$ Ωcm, the electrical conductivity may decrease, and thus, the external input may not be sensed.

According to the principles and illustrative embodiments of the invention, as the lines extending in the first direction DR1 include the flexible lines ELa and ELb having large flexibility and small volume resistance in the portion overlapping the foldable area FA, cracks occurring on the lines due to a tensile stress applied thereto when the display device DD (refer to FIG. 1A) is folded may be reduced or prevented.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel comprising a first non-foldable area, a foldable area adjacent to the first non-foldable area and foldable about to a folding axis, and a second non-foldable area adjacent to the foldable area, the first non-foldable area, the foldable area, and the second non-foldable area being sequentially arranged along a first direction;
   a sensor disposed under the display panel and comprising a plurality of loop portions and a plurality of line portions connected to the loop portions; and
   at least one transverse line comprising at least one of the loop portions and the line portions that overlaps substantially all of the first non-foldable area, the foldable area, and the second non-foldable area,
   wherein:
   the at least one transverse line comprises a first rigid portion overlapping the first non-foldable area, a flexible portion overlapping the foldable area, and a second rigid portion overlapping the second non-foldable area, and
   the flexible portion has a first width, the first rigid portion has a second width, the second rigid portion has a third width, with the first width being greater than the second width and the third width.

2. The display device of claim 1, wherein the difference between the first width and the second width is between about 50 micrometers and about 200 micrometers.

3. The display device of claim 1, wherein the flexible portion comprises a material different from a material of the first and second rigid portions.

4. The display device of claim 1, wherein the foldable area has a width between about 5 mm and about 40 mm.

5. The display device of claim 1, wherein the first rigid portion and the second rigid portion comprise copper.

6. The display device of claim 1, wherein the flexible portion comprises a conductive material.

7. The display device of claim 1, wherein the flexible portion comprises a conductive filler comprising copper, silver, or carbon.

8. The display device of claim 1, wherein the flexible portion comprises a styrene-butadiene rubber, a butadiene rubber, a butyl rubber, a silicone rubber, or a urethane rubber.

9. The display device of claim 1, wherein the flexible portion has a flexibility between about 2% and about 50%.

10. The display device of claim 1, wherein the flexible portion has a volume resistance between about $1 \times 10^{-7}$ Ωcm and about $1 \times 10^{-4}$ Ωcm.

11. The display device of claim 1, wherein each of the first rigid portion and the second rigid portion is provided in plural, and a distance between the first rigid portions and a distance between the second rigid portions are equal to or less than about 200 micrometers.

12. The display device of claim 1, wherein the sensor comprises a digitizer, the loop portions comprise coil portions, the line portions comprise routing line portions and a portion of the digitizer that overlaps the foldable area, has a thickness smaller than a thickness of portions of the digitizer overlapping the first and second non-foldable areas.

* * * * *